3,050,526
3-THIOCYANOMETHYL-2-BENZOTHIAZOLI-
NONES AND BENZOXAZOLINONES
Chien-Pen Lo, Philadelphia, Pa., assignor to Rohm &
Haas Company, Philadelphia, Pa., a corporation of
Delaware
No Drawing. Filed Aug. 8, 1960, Ser. No. 47,949
8 Claims. (Cl. 260—304)

This invention concerns N-thiocyanomethyl compounds of the structure

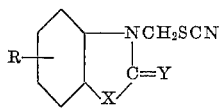

wherein R represents hydrogen, chlorine, bromine, alkyl groups, especially lower alkyl groups of one to 8 carbon atoms, alkoxy groups of one to 4 carbon atoms, phenyl, cycloalkyl groups, and saturated aliphatic monocarboxylic acyl groups of 2 to 4 carbon atoms, and X and Y represent oxygen or sulfur with the proviso that only one of these in a given compound represents sulfur. These compounds are active fungicidal agents for the control of fungus diseases of plants.

Although some organic thiocyanates have been used as insecticides and other thiocyanates have been suggested as possible fungicides, practical application of thiocyanates as fungicides has not yet occurred. Furthermore, it is not possible to predict whether an organic thiocyanate will have fungicidal value. It has now been found that thiocyanates of the above structure can control the growth of various fungi which cause diseases of growing plants without deleterious action on the host plants.

These compounds are prepared by reacting a halomethyl compound of the formula

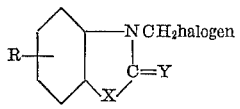

(R, X, and Y being as above), with a salt of thiocyanic acid, such as ammonium, sodium, potassium, calcium, magnesium, or similar thiocyanate. In the above formula, the halogen has an atomic weight of at least 35. The methyl halide may be one such as a 3-chloromethyl-2-benzoxazolinone, 3-bromomethyl-2-benzoxazolinone, or a 3-iodomethyl-2-benzoxazolinone. Starting compounds include 3-halomethyl-2-benzoxazolinone with chlorine or bromine in the 5 or 6 position or with a lower alkyl group, including cycloalkyl groups, such as cyclohexyl, or phenyl, or alkoxy, or acyl, on the benzene ring, the methyl group being the most important of the alkyl groups, but the ethyl, tert-butyl, sec-butyl, tert-octyl, or sec-octyl groups being typical of other useful alkyl groups. Of importance also are the 3-chloromethyl-2-benzthiazolinone, 3-bromomethyl-2-benzthiazolinone, 3-chloromethyl-2-benzoxazolinethione, 3-bromomethyl-2-benzoxazolinethione, and chloro, bromo, alkyl, including cycloalkyl, alkoxy, phenyl, and carboxylic aliphatic acyl derivatives of these ring compounds. There may be two or more such substituents on the benzene ring as in the case of 3-chloromethyl-5-methyl-7-chloro-2-benzoxazolinone.

These halomethyl compounds can be prepared by known methods, starting, for instance, with a phenol (to provide oxygen as X) without or with suitable substituents on the ring thereof, going through nitration followed by reduction of the ortho-nitro group to the amino group with subsequent ring formation with phosgene, urea, or carbon disulfide or a xanthate, reactions which are known to give compounds of the structure

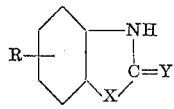

which are then reacted with formaldehyde and then a halogenating agent, such as thionyl chloride, phosphorus trichloride or tribromide or phosphorus and iodine to give the halomethyl derivative.

When it is desired to have sulfur as X, there may be used an ortho-nitro-chlorobenzene, which is reacted stepwise with an alkali metal disulfide and monosulfide, followed by ring formation with phosgene or urea.

Typical methods for preparation of intermediates for forming the necessary halomethyl starting materials may be summarized as follows:

(A)
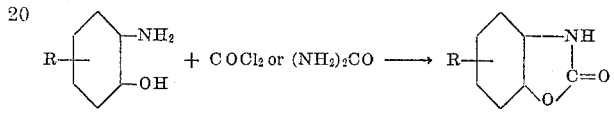

(B)
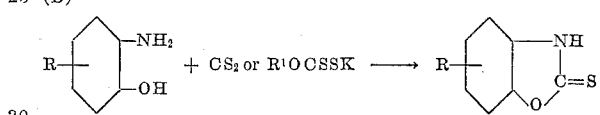

(C)
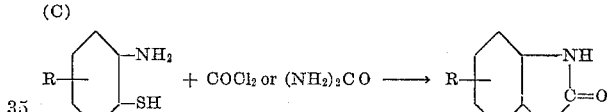

(D)
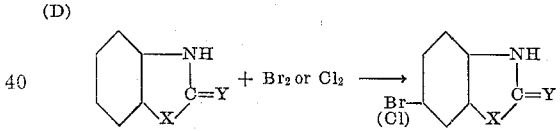

(E)
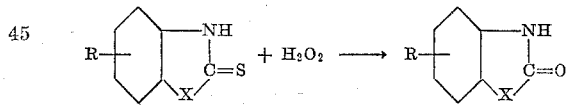

(F)
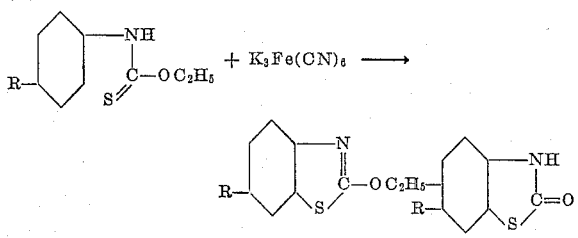

The reaction with the starting halomethyl compounds and thiocyanates is carried out preferably in an inert, volatile, solvent, i.e., one which is inert to the reactants and which can be volatilized from the reaction product without causing decomposition thereof. Useful solvents include acetone, methyl ethyl ketone, benzene, toluene, lower alkanols, dimethylformamide, acetonitrile, ethylene dichloride, and perchloroethylene. A water-miscible solvent is preferred.

Reaction can be effected between about room temperature and about 125° C., preferably between 25° and 65° C., started at low temperature and hastened and/or completed as temperature is elevated. Product may be isolated by removing solvent from the reaction mixture with extraction with water of the halide salt formed or by precipitating the thiocyanomethyl compound by dilution of the reaction mixture with water. Solid products may be purified by recrystallization.

The following illustrative examples provide additional details of preparation. Parts are by weight unless otherwise designated.

*Example 1*

(a) There are mixed 75.5 parts of 2-benzothiazolinone, 5 parts of anhydrous potassium carbonate, 45 parts of aqueous 37% formaldehyde solution, and 350 parts of ethanol. The mixture is stirred and heated under reflux for three hours. A clear solution results. It is concentrated by heating under reduced pressure to about one third of the original volume. The concentrated solution is cooled in an ice bath. Solid forms and is filtered off and dried in the air to give 64 parts of product identified as 3-hydroxymethyl-2-benzothiazolinone. It is recrystallized from ethylene dichloride and then melts at 93°–97° C. It contains by analysis 7.4% of nitrogen (7.73% theory) and 17.5% of sulfur (17.68% theory).

(b) There are mixed 51.5 parts of 3-hydroxymethyl-2-benzothiazoline, 51 parts of thionyl chloride, and 300 parts of ethylene dichloride. The mixture is heated under reflux for two hours. Excess thionyl chloride and solvent are removed by warming under reduced pressure. There results a solid, which is identified as 3-chloromethyl-2-benzothiazolinone. It is recrystallized from carbon tetrachloride and then melts at 97°–99° C. It contains by analysis 17.6% of chlorine and 6.8% of nitrogen (17.8% and 7.0% theory, respectively).

In place of thionyl chloride there may be used phosphorus trichloride or if the bromomethyl compound is desired, phosphorus tribromide, while phosphorus and iodine may be used to give the 3-iodomethyl compound.

(c) There are mixed 5 parts of 3-chloromethyl-2-benzothiazolinone, 2 parts of ammonium thiocyanate, and 60 parts of acetone. The mixture is stirred for 15 minutes at 25°–30° C. and then heated under reflux on a steam bath for 30 minutes. The reaction mixture is poured into 400 parts of water. An oil separates which solidifies when cooled in an ice bath. The solid is filtered off, washed with water, and dried in air. It is identified as 3-thiocyanomethyl-2-benzothiazolinone. It contains by analysis 12.3% of nitrogen and 28.0% of sulfur (12.6% and 28.8% theory, respectively). The product is recrystallized from ethanol and then melts at 95°–98° C.

In place of ammonium thiocyanate there may be used an equivalent amount of calcium, potassium, or sodium thiocyanate with an entirely similar outcome.

*Example 2*

There are mixed 9.2 parts of 3-chloromethyl-2-benzoxazolinone (Zinner, Ber. 89, 2135), 3.8 parts of ammonium thiocyanate, and 60 parts of acetone. This mixture is stirred for about 20 minutes at 25°–30° C. and heated under reflux for about 40 minutes. The reaction mixture is poured into water. Solid separates. It is filtered off, washed, and dried to give 10 parts of 3-thiocyanomethyl-2-benzoxazolinone, which is recrystallized from ethanol. It then melts at 147°–149° C. It contains 13.0% of nitrogen and 14.4% of sulfur (theory 13.6% and 15.5%, respectively).

Substituted 3-halomethyl-2-benzoxazolinones having on the benzene ring chlorine, bromine, alkyl, cycloalkyl, phenyl, alkoxy, or acyl groups react in the same way, giving in each case the corresponding 3-thiocyanomethyl derivative.

*Example 3*

There are mixed 6 parts of 3-chloromethyl-2-benzoxazolinethione, 2.3 parts of ammonium thiocyanate, and 60 parts of acetone. The mixture is stirred and heated as above and poured into water. The resulting mixture is cooled in an ice bath. The solid which forms is filtered off and dried to give 6.5 parts of 3-thiocyanomethyl-2-benzoxazolinethione. After recrystallization from ethanol it melts at 141°–143° C. It contains by analysis 12.0% of nitrogen and 28.3% of sulfur (theory 12.6% and 28.8% respectively).

Again it has been demonstrated that the substituted analogs of the above 3-chloromethyl-2-benzoxazolinethione form 3-thiocyanomethyl derivatives by the above procedure.

There was also prepared 3-thiocyanomethyl-2-benzothiazolinethione, but this compound failed to exhibit the particularly favorable fungistatic and fungitoxic action of the compounds wherein only one of the entities X and Y was sulfur.

*Example 4*

A mixture of 5-chloro-3-chloromethyl-2-benzoxazolinone (5 parts), (melting point 113°–117° C.), ammonium thiocyanate (2 parts) and acetone (25 parts) is stirred and heated under reflux. A solution is first obtained and then a fine precipitate of ammonium chloride forms. The mixture is refluxed for 15 minutes. The reaction mixture is poured into water (200 parts). A light brown solid consisting of 5-chloro-3-thiocyanomethyl-2-benzoxazolinone separates. It is collected and air dried to afford 3 parts of a solid melting at 127°–129° C. After recrystallization from ethanol the 5-chloro-3-thiocyanomethyl-2-benzoxazolinone has a melting point of 130°–132° C. and the following analysis.

Calcd. for $C_9H_5ClN_2O_2S$: C, 44.9; H, 2.09; N, 11.6. Found: C, 44.7; H, 2.37; N, 11.6.

*Example 5*

3-chloromethyl-5-methyl-2-benzoxazolinone (11.7 parts, melting point 106–108° C.) is dissolved in acetone (32 parts). To this is added a solution of ammonium thiocyanate (7.6 parts) in acetone (20 parts). A white precipitate of ammonium chloride forms immediately. The mixture is stirred at room temperature for 30 minutes, refluxed for 15 minutes, and poured into water (250 parts). A yellow oil separates which solidifies after being cooled. The solid is collected and air dried to give 13 parts of 5-methyl-3-thiocyanomethyl-2-benzoxazolinone. After recrystallization from carbon tetrachloride, it has a melting point of 100°–101° C. and the following analysis.

Calcd. for $C_{10}H_8N_2O_2S$: C, 54.5; H, 3.66; N, 12.7. Found: C, 53.3; H, 3.90; N, 12.3.

In the same way there are mixed 17.5 parts of 3-chloromethyl-5-tert-octyl-2-benzoxazolinone, 8.5 parts of sodium thiocyanate, and 75 parts of methyl ethyl ketone. After the mixture is stirred and heated under reflux, the reaction mixture is poured into water. A solid separates. It is filtered off, washed with water, and dried. It is identified as 3-thiocyanomethyl-5-tert-octyl-2-benzoxazolinone, containing 64.0% of carbon, 7.0% of hydrogen, and 8.8% of nitrogen. (Melting point 135°–140° C.)

Other hydrocarbon-substituted thiocyanomethyl compounds are similarly prepared by starting with a cyclohexyl- or phenyl-substituted 3-halomethyl-2-benzoxazolinone, -benzthiazolinone, or -benzoxazolinethione.

*Example 6*

6-bromo-3-chloromethyl-2-benzothiazolinone (8 parts) is dissolved in acetone (80 parts). To this is added a solution of ammonium thiocyanate (5 parts) in acetone (15 parts). The mixture is stirred at room temperature for 2 hours during which time a white precipitate of ammonium chloride separates. The reaction mixture is poured into water (250 parts). A solid separates which is identified as 6-bromo-3-thiocyanomethyl-2-benzothiazolinone. After recrystallization from ethanol it has a melting point of 143–146° C. It contains by analysis 35.7% C, 1.7% H, and 9.0% N. (Theory, 35.9%, 1.66%, and 9.3%, respectively).

Example 7

There are mixed 13 parts of 3-chloromethyl-6-methoxy-2-benzoxazolinone, 7.6 parts of ammonium thiocyanate, and 60 parts of acetone. The mixture is stirred and heated under reflux for a half hour and poured into 300 parts of water. A solid forms on cooling and is separated, washed, and dried. It corresponds in composition to 3-thiocyanomethyl-6-methoxy-2-benzoxazolinone, containing 50.7% of carbon, 3.5% of hydrogen, and 11.8% of nitrogen with a melting point of 118–124° C.

In the same way there can be reacted the corresponding ethoxy- or butoxy-starting compounds to give the corresponding 3-thiocyanomethyl derivatives.

In the same way an equivalent amount of 3-chloromethyl-5-acetyl-2-benzoxazolinone is reacted with ammonium thiocyanate to give 3-thiocyanomethyl-5-acetyl-2-benzoxazolinone. The propionyl or butyryl analogues react in the same way to give corresponding 3-thiocyanomethyl derivatives.

Thiocyanomethyl compounds of this invention were examined in standard tests for fungitoxicity. By this slide germination method 3-thiocyanomethyl-2-benzoxazolinone, for example, was found to have $ED_{50}$ values of 1–10 p.p.m. against *Alternaria solani*, of 50–200 p.p.m. against *Monolinia fructicola*, and of 10–50 p.p.m. against *Stemphylium sarcinaeforme*. In an evaluation of this compound against late blight on tomato plants, this compound was found to be effective at about one fourth the concentration used to control blight with zineb as a standard of comparison.

3-thiocyanomethyl-2-benzoxazolinethione was effective against all three of the above organisms at 10–50 p.p.m. In late blight tests it was effective at lower concentrations than zineb as a standard.

3-thiocyanomethyl-2-benzothiazolinone gave $ED_{50}$ values of less than one p.p.m. against *Alternaria solani* and *Stemphylium sarcinaeforme* and of 1–10 p.p.m. against *Monolinia fructicola* in standard slide germination tests. In late blight tests on tomato plants this compound was exceptionally effective, $ED_{50}$ values of about 20 p.p.m. being obtained as compared to 370 p.p.m. for zineb.

Other compounds described above also give very favorable values in standard fungitoxicity tests. At the same time, the tests for phytotoxicity also appear favorable. For example, 3-thiocyanomethyl-5-chlorobenzoxazolinone gave $ED_{50}$ values of 10–50 p.p.m. or less against the standard test organisms, while the comparable compounds containing a sulfur atom in the place of an oxygen atom are somewhat more potent, especially the thiazolinones. The compound 3-thiocyanomethyl-6-bromo-2-benzthiazolinone gave an $ED_{50}$ value of less than one against *Stemphylium sarcinaeforme* and somewhat higher $ED_{50}$ values against the other organisms. An exceptionally potent compound is 3-thiocyanomethyl-5-methyl-2-benzoxazolinone, which gave $ED_{50}$ values of less than one p.p.m. against all three test organisms. The comparable methoxy derivatives appear similarly potent.

The compounds of this invention are best used diluted with a carrier which may be liquid or solid. Dusts may be prepared with a finely divided solid such as talc, clay, pyrophyllite, diatomaceous earth, hydrated silica, calcium silicate, or magnesium carbonate. If desired, wetting and/or dispersing agents may be used. When the proportions of these are increased, there results a wettable powder, which may be taken up in water and applied from a spray.

Dusts may contain 1% to 15% of one or more compounds of this invention, while wettable powders may contain up to 50% or more of one or more of these compounds.

A typical formulation of a wettable powder comprises 20% to 50% of thiocyanomethyl compound, 45% to 75% of one or more finely divided solids, 1% to 5% of a wetting agent, and 1% to 5% of a dispersing agent. Typical wetting agents include sodium dodecyl sulfate, sodium nonylbenzene sulfonate, sodium dioctyl sulfosuccinate, octylphenoxypolyethoxyethanol, or other non-ionic agents, such as the ethylene and/or propylene oxide condensates with long-chained alcohols, mercaptans, amines, or carboxylic acids. Typical dispersing agents include the sodium sulfonate of condensed naphthalene-formaldehyde and lignin sulfonates.

Liquid concentrates may also be used. These are prepared by taking up the thiocyanomethyl compound in an organic solvent therefor together with one or more surface active agents. For example, there may be mixed 25 parts of one of the above thiocyanomethyl compounds, .5 parts of a surface-active solvent-soluble alkylphenoxypolyethoxyethanol and 70 parts of one or more solvents, such as dimethyl sulfoxide or dimethylformamide, or mixtures of these with xylene or xylene and isophorone.

The compounds of this invention may be used in conjunction with other fungicidal agents such as a dithiocarbamate or a thiuram and also in conjunction with miticides or insecticides or other pesticides.

I claim:
1. A compound of the structure

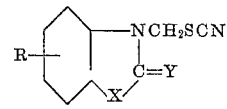

wherein R is a member selected from the class consisting of hydrogen, chlorine, bromine, alkyl of one to eight carbon atoms, alkoxy of one to four carbon atoms, cyclohexyl, phenyl, and alkanoyl of two to four carbon atoms, and X and Y are selected from the class consisting of oxygen and sulfur with the proviso that in a given compound only one is sulfur.
2. 3-thiocyanomethyl-2-benzoxazolinone.
3. 3-thiocyanomethyl-2-benzothiazolinone.
4. 3-thiocyanomethyl-2-benzoxazolinethione.
5. 3-thiocyanomethyl-5-chloro-2-benzoxazolinone.
6. 3-thiocyanomethyl-6-bromo-2-benzothiazolinone.
7. 3-thiocyanomethyl-5-methyl-2-benzoxazolinone.
8. 3-thiocyanomethyl-6-methoxy-2-benzoxazolinone.

References Cited in the file of this patent
UNITED STATES PATENTS

| | | |
|---|---|---|
| 2,922,794 | Model | Jan. 26, 1960 |
| 2,932,649 | Metivier | Apr. 12, 1960 |
| 2,974,085 | Bartels et al. | Mar. 7, 1961 |

OTHER REFERENCES

Davies et al.: Chem. Abstracts, vol. 41, col. 405–6 (1947).

Harris: Chem. Abstracts, vol. 43, col. 3964 (1949).

Poppe et al.: Chem. Abstracts, vol. 52, col. 20840 (1958).